United States Patent Office 3,317,605
Patented May 2, 1967

3,317,605
PROCESS FOR PREPARING 2,2',4,4'-TETRABROMO-N-(LOWERALKYL) DIPHENYLAMINE
Leonard M. Weinstock, Rocky Hill, and William Paleveda, Jr., Rahway, N.J., assignors to Merck & Co., Inc., Rahway, N.J., a corporation of New Jersey
No Drawing. Continuation of application Ser. No. 81,229, Jan. 9, 1961. This application Feb. 4, 1964, Ser. No. 342,517
15 Claims. (Cl. 260—576)

This application is a continuation of application Ser. No. 81,229, filed Jan. 9, 1961, now abandoned.

This invention relates to a process for preparing organic compounds useful as intermediates in the synthesis of phenazasiline compounds found to be suitable as antioxidants for high temperature lubricants and more particularly to a process for preparing 2,2', 4,4'-tetrabromo-N-(lower alkyl)-diphenylamines having the structural formula:

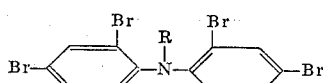

where R is a lower alkyl radical.

The procedure followed in converting the tetra-bromo intermediate to the corresponding 5-(lower alkyl)-10-10-diphenylphenazasiline is described in the patent application of my associates Jones and Wasserman, Ser. No. 836,928, filed Aug. 31, 1959, now Patent No. 3,065,251, issued Nov. 20, 1962. As is described therein, the intermediate is reacted with a straight chain lower alkyl lithium compound to form a 2,2',-dilithio-4,4'-dibromo-N-(lower alkyl)-diphenylamine, which is then reacted with a dihalodihydrocarbon substituted silane. The product of this latter reaction is then hydrogenated in the presence of a catalyst to yield 5-(lower alkyl)-10-10-diphenylphenazasiline.

In the process of the present invention, an N-(lower alkyl)-diphenylamine having the structural formula:

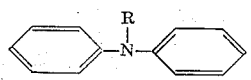

where R is a lower alkyl radical, is used as the starting material. A procedure for preparing these materials appears in Chemical Abstracts, vol. 47, 1953, page 9284b. Attempts at brominating these compounds by conventional techniques ordinarily result in dealkylation or incomplete bromine substitution. It has been theorized that the HBr which forms during the bromination complexes with the nitrogen atom of the initially formed brominated intermediates or of the starting material itself. These complexed intermediates resist further bromination so that complete tetrabromo substitution in the N-(lower alkyl)-diphenylamine molecule is never achieved.

Accordingly, it is an object of the present invention to provide an economical process for the preparation of intermediates useful in the synthesis of phenazasiline derivatives.

It is another object of the present invention to provide a process for brominating an N-(lower alkyl)-diphenylamine without cleaving the lower alkyl group.

It is a more specific object of the present invention to provide a process for brominating an N-(lower alkyl)-diphenylamine in the 2,2', 4,4' positions without cleaving the lower alkyl group.

These and other objects will become apparent when consideration is given to the following disclosure.

According to the present invention there is provided a process for brominating compounds of the structural formula:

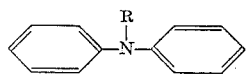

wherein R is a lower alkyl radical, to yield the 2,2', 4,4'-tetrabromo substituted derivative. The process of the present invention involves brominating N-(lower alkyl)-diphenylamine in a two phase solvent system comprising water and an inert, water immiscible organic solvent, preferably in the presence of a small amount of an added weak base.

The organic solvent employed in the process of the present invention is selected on the basis of its ability to dissolve the N-(lower alkyl)-diphenylamine, its inertness with respect to the reactants in the system, and its water immiscibility, i.e., its ability to form a second phase with water. The organic solvent should allow complete bromination in the 2,2', 4,4' positions of the N-(lower alkyl)-diphenylamine molecule during the bromination step without cleaving the lower alkyl group. It has been discovered that non-polar, non-protonic water immiscible solvents perform suitably in this bromination reaction. Illustrative of these solvents are non-polar ethers, such as dialkyl ethers; aliphatic hydrocarbons such as hexane, heptane, and octane; chlorinated aliphatic hydrocarbons such as chloroform, carbon tetrachloride, and ethylene chloride; and aromatic hydrocarbons such as benzene and toluene. Such solvents may be used singularly or in combination in the process of the present invention.

In accordance with the process of the present invention, the bromination is carried out in the presence of water admixed with the organic solvent. When employed in the amounts specified hereinafter, the presence of the water as the second phase permits tetrabromo substitution of the N-(lower alkyl)-diphenylamine without cleaving the lower alkyl group. It is thought that the water, as a distinct phase, preferentially accepts the HBr formed during the bromination, thereby removing it from the organic phase. The HBr is thus prevented from complexing with the nitrogen atom of either the brominated intermediate or the starting material dissolved in the organic phase. Having removed the possibility of complexing, the brominated intermediate and the starting material are then available for further bromination. Irrespective of the theory involved, the total amount of water provided in the two phase solvent system is dependent upon the amount of solvent present and the quantity of N-(lower alkyl)-diphenylamine dissolved therein. Satisfactory bromination is achieved when the solvent system comprises at least 2% water by volume while the ratio of water to N-(lower alkyl)-diphenylamine is at least one ml. per gm. of solute. Preferably, however, 15 to 75% water is provided in the solvent system while the water-solute ratio is maintained at between 4 and 12 ml. per gm. Higher concentrations of water than those indicated hereinabove may be employed in the process of the present invention, although the yield of the desired 2,2', 4,4'-tetrabromo-N-(lower alkyl)-diphenylamine is somewhat lower.

In practicing the method of the present invention, it is preferable, though not essential, to add a small amount of a weak base to the reaction mixture. The presence of the base serves to improve the yield of the final product by supplementing the accepting power of the water. The base accepts more vigorously the HBr which forms as a result of the bromination thereby driving the reaction to completion. Bases which are at least as strong as water but not stronger than aqueous sodium carbonate are suitable for this purpose. Bases which are stronger than aqueous sodium carbonate are generally not as suitable in that the bromine may be converted to hypobromite ion. Accordingly, suitable bases include sodium carbonate, sodium bicarbonate, and calcium carbonate. A significant improvement in yield is effected when one molar equivalent of base is added per mole of bromine supplied to the reaction mixture, although the amount is not critical. It will be obvious to those skilled in the art that when no other base is added, the water present in the organic solvent system will itself act as a weak base.

The brominating agent used in the process of the present invention is supplied to the reaction mixture as liquid bromine in an amount of at least 4 moles $Br_2$ per mole of N-(lower alkyl)-diphenylamie. It is preferred, however, to use an amount of bromine slightly in excess of that theoretically required. The bromine is conveniently added to the reaction mixture in solution with a portion of the desired organic solvent.

The reaction of the present invention is slightly exothermic and proceeds rapidly at room temperature. The reaction may be speeded up somewhat by heating to temperatures up to the refluxing point of the particular solvent employed in the solvent system, or slowed down by external cooling as desired. In any event, the temperature is not critical, satisfactory results being obtained without the application of external heating or cooling.

The following examples are provided for purposes of illustration only and are not intended to limit the scope of the present invention.

EXAMPLE 1

*Preparation of 2,2', 4,4'-tetrabromo-N-ethyl-diphenylamine ($CCl_4$-$H_2O$ system)*

To a rapidly stirred mixture of 20 ml. of water and 5.0 gms. (0.0254 mole) of N-ethyl-diphenylamine in 60 ml. of carbon tetrachloride is added dropwise a solution of 16.25 gms. (0.1015 mole) of bromine in 20 ml. of carbon tetrachloride. The temperature is kept at 20–25° C. during the addition. After the reaction is complete any excess bromine is discharged by addition of 1.0 gm. of $NaHSO_3$. Thereafter the $CCl_4$ layer is separated, washed with 100 ml. of 3% aqueous $Na_2CO_3$, then with 100 ml. $H_2O$ and finally drived over $Na_2SO_4$. The solution containing the product is evaporated to dryness in vacuo and the 2,2', 4,4'-tetrabromo-N-ethyl-diphenylamine is recrystallized from 26 ml. of ethyl acetate in 70% yield, M.P. 135–137° C.

EXAMPLE 2

*Preparation of 2,2', 4,4'-tetrabromo-N-ethyl-diphenylamine (benzene-$H_2O$ system)*

Using the procedure of Example 1 and substituting an equivalent quantity of benzene for the carbon tetrachloride, the 2,2', 4,4'-tetrabromo-N-ethyl-diphenylamine is obtained in 69% yield, M.P. 127–133° C.

EXAMPLE 3

*Preparation of 2,2', 4,4'-tetrabromo-N-ethyl-diphenylamine ($CHCl_3$-$H_2O$-$NaHCO_3$ system)*

To a rapidly stirred mixture of 60 ml. of water, 5.0 gms. (0.0254 mole) of N-ethyl-diphenylamine, 15 gms. $NaHCO_3$, and 60 ml. of chloroform is added dropwise a solution of 16.25 gms. (0.1015 mole) of bromine in 20 ml. of chloroform. The temperature is kept at 20–25° during the addition. After the reaction is complete, the excess bromine is discharged by addition of 1.0 gm. of $NaHSO_3$. Thereafter the chloroform layer is separated, washed with 100 ml. of aqueous $Na_2CO_3$, then with 100 ml. $H_2O$ and finally dried over $Na_2SO_4$. The solution of product is evaporated to dryness in vacuo and the 2,2', 4,4'- tetrabromo - N - ethyl - diphenylamine recrystallized from 26 ml. of ethyl acetate in 82% yield, M.P. 135–137° C.

EXAMPLE 4

*Preparation of 2,2', 4,4'-tetrabromo-N-ethyl-diphenylamine (n-hexane-$H_2O$-$Na_2CO_3$ system)*

Using the procedure of Example 3 and substituting an equivalent amount of n-hexane for the chloroform and an equivalent amount of carbonate for sodium bicarbonate, the 2,2', 4,4'-tetrabromo-N-ethyl-diphenylamine is obtained in similarly high yields.

EXAMPLE 5

*Preparation of 2,2', 4,4'-tetrabromo-N-ethyl-diphenylamine (heptane-ethylene chloride-$H_2O$-$NaHCO_3$ system)*

To a rapidly sitrred mixture of 60 ml. $H_2O$, 15 gm. $NaHCO_3$, 75 ml. of heptane, 25 ml. ethylene chloride and 5 gms. (0.0254 mole) of N-ethyl-diphenylamine is added dropwise a solution of 16.25 gms. (0.1015 mole) $Br_2$ in 20 ml. ethylene chloride. The temperature is kept at 20–25° C. during the addition. After the reaction is complete, the excess bromine is discharged by addition of 1 gm. of $NaHSO_3$. The organic layer is separated and treated according to the procedure of Example 1 to form the product.

EXAMPLE 6

*Preparation of 2,2', 4,4'-tetrabromo-N-butyl-diphenylamine (diethyl ether-toluene-$H_2O$-$NaHCO_3$ system)*

To a rapidly stirred mixture of 60 ml. $H_2O$ containing 15 gm. $NaHCO_3$, 75 ml. of diethyl ether, 25 ml. toluene and 5.72 gms. (0.0254 mole) of N-butyl-diphenylamine is added dropwise a solution of 16.25 gms. (0.1015 mole) $Br_2$ in 20 ml. toluene. The temperature is kept at 20–25° C. during the addition. After the reaction is complete, the excess bromine is discharged by addition of 1 gm. of $NaHSO_3$. The organic layer is separated and treated according to the procedure of Example 1 to form the product.

EXAMPLE 7

*Preparation of 2,2', 4,4'-tetrabromo-N-hexyl-diphenylamine (benzene-$H_3O$-$NaHCO_3$ system)*

To a rapidly stirred mixture of 60 ml. of water containing 6.33 gms. (0.0254 mole) of N-hexyl diphenylamine and 15 gms. $NaHCO_3$ in 60 ml. of benzene is added dropwise a solution of 16.25 gms. (0.1015 mole) of bromine in 20 ml. of benzene. The temperature is kept at 20–25° C. during the addition. After the reaction is complete, the excess bromine is discharged by addition of 1.0 gm. of $NaHSO_3$. The benzene layer is then separated, washed with 100 ml. of 3% aqueous $Na_2CO_3$, then with 100 ml. $H_2O$ and finally dried over $Na_2SO_4$. The solution of product is evaporated to dryness in vacuo and the 2,2', 4,4'-tetrabromo-N-hexyl-diphenylamine recrystallized from 26 ml. of ethyl acetate.

Any departure from the above description which conforms to the present invention is intended to be included within the scope of the claims.

What is claimed is:

1. A process for producing a compound of the formula:

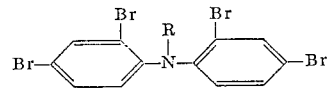

which comprises contacting a solute compound having the structural formula:

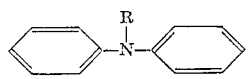

wherein R is a lower alkyl radical, with at least 4 moles of bromine per mole of said solute compound in a two phase solvent system comprising water as one phase and an inert, water-immiscible, non-polar organic solvent for said solute compound as the second phase, said solvent system comprising at least 2% of water by volume and at least one ml. water per gm. of said solute compound.

2. The process according to claim 1 wherein the bromine contacts the solvent system in the presence of sodium carbonate, sodium bicarbonte or calcium carbonate.

3. The process according to claim 2 wherein the organic solvent is selected from the group consisting of ethers, alphatic hydrocarbons, chlorinated aliphatic hydrocarbons, and aromatic hydrocarbons.

4. A process for producing a compound of the formula:

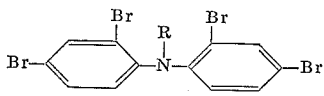

which comprises contacting a solute compound having the formula:

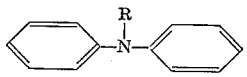

wherein R is a lower alkyl radical, with at least 4 moles of bromine per mole of said solute compound in a two phase solvent system comprising water as one phase and a water-immiscible, non-polar organic solvent for said solute compound as the second phase, said solvent system comprising between 15 and 75% water by volume and containing between 4 and 12 ml. of water per gm. of said solute compound.

5. The process according to claim 4 wherein the organic solvent is selected from the group consisting of ethers, aliphatic hydrocarbons, chlorinated aliphatic hydrocarbons, and aromatic hydrocarbons.

6. The process according to claim 5 wherein the bromine contacts the solvent system in the presence of sodium carbonate, sodium bicarbonate or calcium carbonate.

7. The process according to claim 5 wherein R is the ethyl radical, and the solvent system comprises water and carbon tetrachloride.

8. The process according to claim 5 wherein R is the ethyl radical, and the solvent system comprises water and chloroform.

9. The process according to claim 5 wherein R is the ethyl radical, and the solvent system comprises water and benzene.

10. The process according to claim 5 wherein R is the ethyl radical, and the solvent system comprises water and ethylene chloride.

11. The process according to claim 5 wherein R is the ethyl radical, and the solvent system comprises water and hexane.

12. The process according to claim 5 wherein R is the ethyl radical, and the solvent system comprises water and heptane.

13. The process according to claim 5 wherein R is the ethyl radical, and the solvent system comprises water and diethyl ether.

14. The process according to claim 5 wherein R is the ethyl radical, and the solvent system comprises water and toluene.

15. The process according to claim 5 wherein R is the ethyl radical, and the organic solvent system comprises water and octane.

References Cited by the Examiner

Lugovkin et al.: "Chemical Abstracts," vol. 47, pp. 9284–5 (1953).

CHARLES B. PARKER, *Primary Examiner.*

JOSEPH P. BRUST, *Examiner.*

ROBERT V. HINES, *Assistant Examiner.*